United States Patent [19]
Reber et al.

[11] Patent Number: 6,137,654
[45] Date of Patent: Oct. 24, 2000

[54] DEVICE HAVING A DISKETTE-LIKE HOUSING AND A WIRELESS TRANSCEIVER AND METHODS THEREFOR

[75] Inventors: William L. Reber, Schaumburg, Ill.; Mark S. Knighton, Santa Monica, Calif.

[73] Assignee: Motorola, Inc., Schaumburg, Ill.

[21] Appl. No.: 08/880,971

[22] Filed: Jun. 23, 1997

[51] Int. Cl.[7] .................................................. G11B 23/03
[52] U.S. Cl. ............................................................ 360/133
[58] Field of Search .................................. 360/133, 137; 395/280

[56] References Cited

U.S. PATENT DOCUMENTS

| | | | |
|---|---|---|---|
| 3,818,190 | 6/1974 | Silverman et al. | 235/382 |
| 3,999,042 | 12/1976 | Silverman et al. | 235/382 |
| 4,044,227 | 8/1977 | Holm et al. | 235/437 |
| 4,721,849 | 1/1988 | Davis et al. | 235/472 |
| 4,734,897 | 3/1988 | Schotz | 369/2 |
| 4,736,096 | 4/1988 | Ushikubo et al. | 235/472 |
| 4,801,789 | 1/1989 | Davis | 235/472 |
| 4,803,643 | 2/1989 | Hickey | 707/513 |
| 4,841,132 | 6/1989 | Kajitani et al. | 235/462.46 |
| 4,916,441 | 4/1990 | Gombrich | 340/712 |
| 4,937,853 | 6/1990 | Brule et al. | 463/17 |
| 5,115,326 | 5/1992 | Burgess et al. | 358/440 |
| 5,132,947 | 7/1992 | Kameda et al. | 369/32 |
| 5,156,898 | 10/1992 | McDonald | 428/100 |

(List continued on next page.)

FOREIGN PATENT DOCUMENTS

| | | |
|---|---|---|
| WO 97/01137 | 1/1997 | WIPO . |
| WO 98/03923 | 1/1998 | WIPO . |
| WO 98/20411 | 5/1998 | WIPO . |

OTHER PUBLICATIONS

White, Ron, "How Computers Work", Ziff–Davis Press, Emeryville, California, p. 61, 1995.
From the Internet–Yahoo: InteliData Intro. Revolutionary "Money Clip", Apr. 8, 1997.
Tuiger Barcodzz Electronic LCD Game, Marvel Comics, X–Men, 1994.
AC&E Bar Code Information, http://www.intrepid.net/nscanhte/pagetwo.html.
Zuckerman, "It's a Brand New E–Mail, Companies Want to Turn Computers Into Postage Meters", *The New York Times*, Monday, Apr. 28, 1997.
O'Malley, "Web TV", 10 PS 96, pp. 49–53.
Randall, "Discover the World Wide Web with your Sportster", Samns.net.Publishing, 1996, (pp. 1–8).
"Advertising", *Community ConneXion, Inc.*, http://www.anonymixer.com/advert.html, 1995–1996, (p. 1).
"The Anonymizer FAQ", *Community ConneXtion, Inc.*, http://www.anonymixer.com/fag.html, 1995–1996, (pp. 1–5).
"Receive Electronic Shipment Information via your PC," http://www.shiprps.com/service/access.thm, 1998.
"Postal Automation," http://www.ccmail.com/postal.html, No date.
"Bar Code Pro Software," http://www.ciag.com/bcp.htm, No date.

*Primary Examiner*—Jefferson Evans
*Attorney, Agent, or Firm*—James E. Gauger

[57] ABSTRACT

An interface device includes at least one of an infrared receiver (14) and an infrared transmitter (16) to communicate with an external device (39). The infrared receiver (14) and/or the infrared transmitter (16) is supported by a diskette-like housing (10). A transducer (30) supported by the diskette-like housing (10) facilitates communication between the interface device and a diskette drive (12). Methods of using the interface device are disclosed.

10 Claims, 4 Drawing Sheets

U.S. PATENT DOCUMENTS

| | | | |
|---|---|---|---|
| 5,161,131 | 11/1992 | Borchardt et al. | 369/1 |
| 5,224,216 | 6/1993 | Gordon et al. | 395/275 |
| 5,280,625 | 1/1994 | Howarter et al. | 709/218 |
| 5,308,685 | 5/1994 | Froggatt | 428/204 |
| 5,319,562 | 6/1994 | Whitehouse | 705/403 |
| 5,331,136 | 7/1994 | Koenck et al. | 235/375 |
| 5,410,141 | 4/1995 | Koenck et al. | 235/472 |
| 5,416,310 | 5/1995 | Little | 235/462 |
| 5,423,054 | 6/1995 | Schmidt et al. | 360/133 |
| 5,457,590 | 10/1995 | Barrett et al. | 360/133 |
| 5,465,381 | 11/1995 | Schmidt | 360/133 |
| 5,468,952 | 11/1995 | Alexander et al. | 235/492 |
| 5,510,992 | 4/1996 | Kara et al. | 705/408 |
| 5,539,870 | 7/1996 | Conrad et al. | 345/352 |
| 5,548,722 | 8/1996 | Jalalian et al. | 709/220 |
| 5,583,940 | 12/1996 | Vidrascu et al. | 713/151 |
| 5,584,043 | 12/1996 | Burkart | 395/882 |
| 5,590,197 | 12/1996 | Chen et al. | 705/65 |
| 5,602,918 | 2/1997 | Chen et al. | 713/153 |
| 5,606,507 | 2/1997 | Kara | 705/408 |
| 5,613,012 | 3/1997 | Hoffman et al. | 382/115 |
| 5,625,781 | 4/1997 | Cline et al. | 345/335 |
| 5,629,733 | 5/1997 | Youman et al. | 348/7 |
| 5,630,079 | 5/1997 | Mc Laughlin | 345/335 |
| 5,636,096 | 6/1997 | Mardirossian | 360/133 |
| 5,638,504 | 6/1997 | Scott et al. | 707/530 |
| 5,640,002 | 6/1997 | Ruppert et al. | 235/462.46 |
| 5,640,193 | 6/1997 | Wellner | 348/7 |
| 5,640,565 | 6/1997 | Dickenson | 707/103 |
| 5,659,164 | 8/1997 | Schmid et al. | 235/375 |
| 5,664,110 | 9/1997 | Green et al. | 705/26 |
| 5,664,228 | 9/1997 | Mital | 395/882 |
| 5,668,990 | 9/1997 | Bajorninas | 707/104 |
| 5,677,955 | 10/1997 | Dogett et al. | 705/76 |
| 5,689,642 | 11/1997 | Harkins et al. | 709/207 |
| 5,694,471 | 12/1997 | Chen et al. | 705/76 |
| 5,694,546 | 12/1997 | Resiman | 705/26 |
| 5,717,860 | 2/1998 | Graber et al. | 709/227 |
| 5,724,595 | 3/1998 | Gentner | 707/501 |
| 5,734,371 | 3/1998 | Kaplan | 345/158 |
| 5,745,389 | 4/1998 | Russell | 702/123 |
| 5,752,022 | 5/1998 | Chiu et al. | 707/10 |
| 5,758,216 | 5/1998 | Arnold | 396/311 |
| 5,771,143 | 6/1998 | Vernois | 360/133 |
| 5,804,803 | 9/1998 | Cragun et al. | 235/375 |
| 5,815,830 | 9/1998 | Anthony | 707/6 |
| 5,819,241 | 10/1998 | Reiter | 705/408 |
| 5,827,180 | 1/1998 | Goodman | 600/300 |
| 5,834,749 | 11/1998 | Durbin | 235/454 |
| 5,851,186 | 12/1998 | Wood et al. | 600/437 |
| 5,869,819 | 2/1999 | Knowles et al. | 235/375 |
| 5,905,248 | 5/1999 | Russell et al. | 235/462 |
| 5,905,251 | 5/1999 | Knowles | 235/472.01 |
| 5,918,214 | 6/1999 | Perkowski | 705/27 |
| 5,933,829 | 8/1999 | Durst et al. | 707/10 |

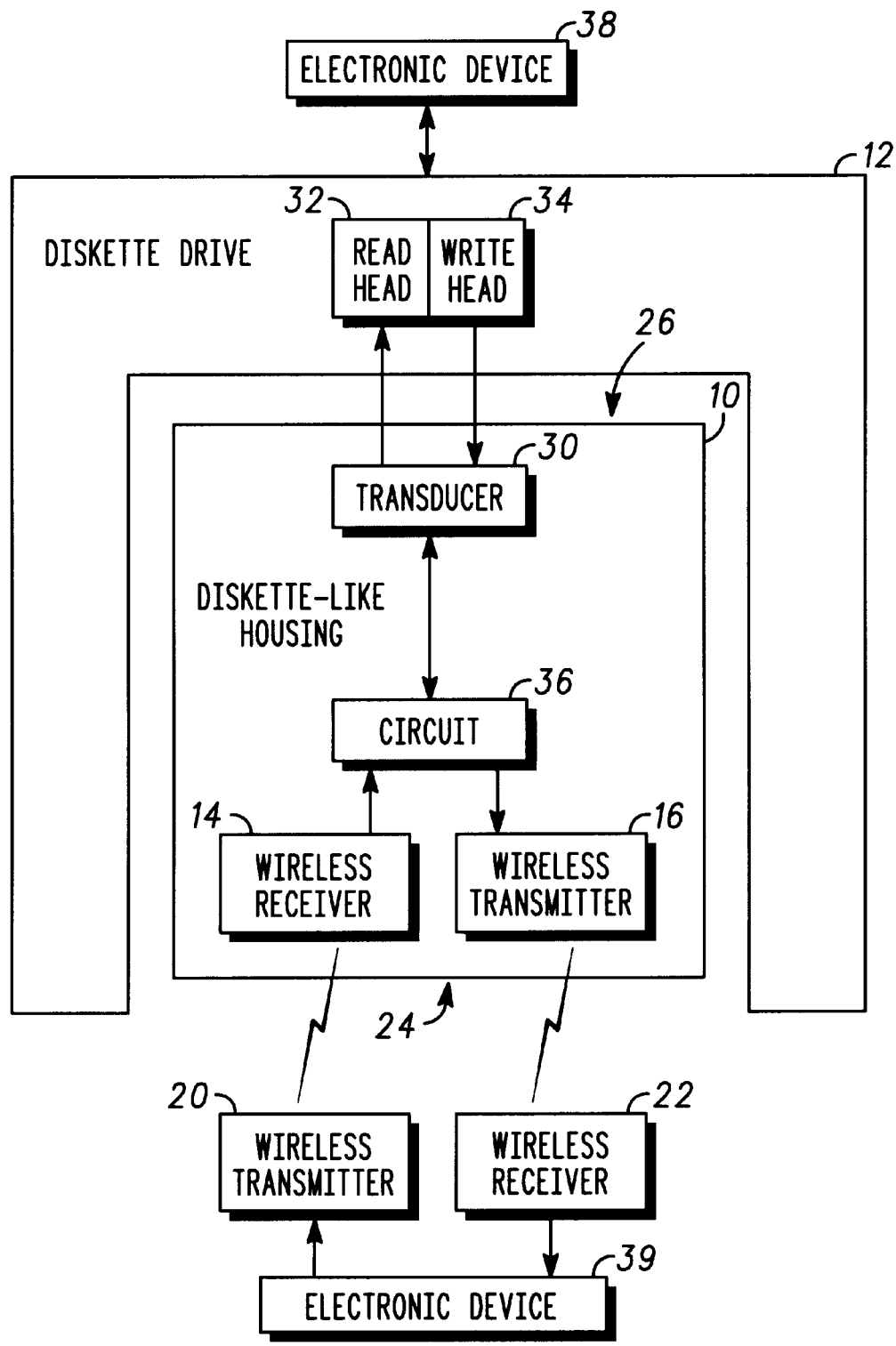
*F I G .1*

DEVICE HAVING A DISKETTE-LIKE HOUSING AND A WIRELESS TRANSCEIVER AND METHODS THEREFOR

TECHNICAL FIELD

The present invention relates to computer interface devices.

BACKGROUND OF THE INVENTION

Fischer International Systems Corporation has developed a device which transforms a floppy drive of a personal computer into a smart card reader. The device, marketed using the names Smarty™ and MoneyClip™, receives a smart card within a standard 3.5 inch floppy disk housing. The device includes a transducer and electronic circuitry to emulate magnetic fields produced by a rotating floppy disk. Using the transducer, data stored by the smart card is readable by the floppy drive.

Advantageously, the aforementioned device provides a low-cost smart card reader without occupying a computer port. Disadvantageously, the aforementioned device occupies the floppy disk drive for the dedicated purpose of reading a smart card.

BRIEF DESCRIPTION OF THE DRAWINGS

The invention is pointed out with particularity in the appended claims. However, other features of the invention will become more apparent by referring to the following detailed description in conjunction with the accompanying drawings in which:

FIG. 1 is a block diagram of an embodiment of an interface device in accordance with the present invention;

DETAILED DESCRIPTION OF A PREFERRED EMBODIMENT

Figure 2:
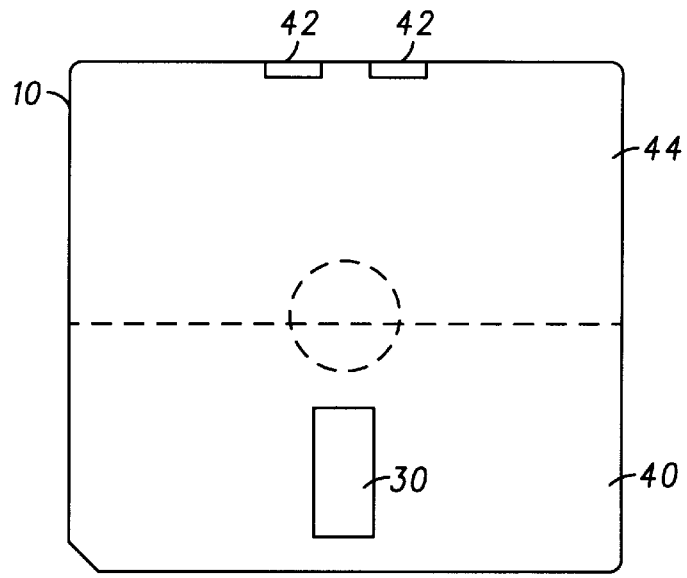
FIG. 2 is an external view of a preferred embodiment of the interface device.

FIG. 1 is a block diagram of an embodiment of an interface device in accordance with the present invention. The interface device includes a diskette-like housing 10. The diskette-like housing 10 is shaped and sized to be received by a diskette drive 12. Preferably, the diskette-like housing 10 is similarly sized and/or shaped as a 3.5 inch diskette for reception by a 3.5 inch diskette drive. In general, the diskette-like housing 10 can be similarly sized and/or shaped as any diskette in order to be received by a diskette drive therefor. It is noted that the diskette-like housing 10 may or may not be equivalently sized and/or shaped as its associated diskette.

The diskette-like housing 10 supports a wireless receiver 14 and a wireless transmitter 16. Both the wireless receiver 14 and the wireless transmitter 16 are externally accessible when the diskette-like housing 10 is inserted into the diskette drive 12. As a result, when the diskette-like housing 10 is inserted into the diskette drive 12, the wireless receiver 14 can receive signals from a wireless transmitter 20 external to the diskette drive 12, and the wireless transmitter 16 can transmit signals for reception by a wireless receiver 22 external to the diskette drive 12.

Preferably, the wireless receiver 14 includes an infrared receiver for receiving infrared signals. Similarly, it is preferred that the wireless transmitter 16 includes an infrared transmitter for transmitting infrared signals. In an exemplary embodiment, the infrared receiver and the infrared transmitter communicate IrDA (Infrared Data Association)-compliant signals. In this case, the infrared receiver and the infrared transmitter can be provided by an IrDA-compliant transceiver, such as those available from Hewlett-Packard Corporation.

Alternatively, the wireless receiver 14 can include an ultrasonic receiver for receiving ultrasonic signals, or a radio frequency receiver for receiving radio frequency signals. Similarly, the wireless transmitter 16 can alternatively include an ultrasonic transmitter for transmitting ultrasonic signals, or a radio frequency transmitter for transmitting radio frequency signals. In general, the wireless receiver 14 and the wireless transmitter 16 can communicate acoustic signals, light signals, and/or electromagnetic signals with the wireless receiver 22 and the wireless transmitter 20.

Preferably, the wireless receiver 14 and the wireless transmitter 16 are accessible near a first end 24 of the diskette-like housing 10. The first end 24 is opposite to a second end 26 of the diskette-like housing 10 which is first received by the diskette drive 12 when the diskette-like housing 10 is inserted into the diskette drive 12. As a result, the wireless receiver 14 and the wireless transmitter 16 are proximate to an external opening of the diskette drive 12 when the diskette-like housing 10 is inserted into the diskette drive 12.

The diskette-like housing 10 supports a transducer 30 for communicating data with the diskette drive 12. The transducer 30 is responsive to the wireless receiver 14 to generate a field associated with data received by the wireless receiver 14. The field generated by the transducer 30 is readable by a read head 32 of the diskette drive 12. The wireless transmitter 16 is responsive to the transducer 30 to transmit a wireless signal associated with data received by the transducer 30. The transducer 30 is sensitive to a field generated by a write head 34 of the diskette drive 12 to receive the data.

Preferably, the transducer 30 communicates with the heads 32 and 34 using magnetic fields. In this case, the transducer 30 generates magnetic fields readable by the read head 32 and receives magnetic fields produced by the write head 34. Alternatively, the transducer 30 can communicate with the heads 32 and 34 using electric fields, or can communicate optical signals with the heads 32 and 34.

Preferably, a circuit 36 associated with the transducer 30 is supported within the diskette-like housing 10. The circuit 36 drives the transducer 30 to emulate magnetic fields produced by a rotating floppy disk. Additionally, the circuit 36 is responsive to the transducer 30 to determine data encoded by magnetic fields produced by the write head 34. For these purposes, the transducer 30 and the circuit 36 can include like components of the Smarty™ smart card reader available from Fischer International Systems Corporation, or like components in U.S. Pat. No. 5,584,043 to Burkart which is hereby incorporated by reference into the present application.

The circuit 36 includes terminals which electrically couple to a battery. The battery, which can include a button cell or a coin cell, is used to power the circuit 36. The diskette-like housing 10 includes a location to house the battery.

The aforementioned interface device provides a means for communicating data between an electronic device 38 associated with the diskette drive 12 and an electronic device 39 associated with the wireless transmitter 20 and the wireless receiver 22. Examples of the electronic device 38 include, but are not limited to, desktop computers, notebook computers, and other computers having a floppy disk drive. Examples of the electronic device 39 include, but are not limited to: notebook computers, palmtop computers, and other computers having an integrated wireless transceiver; computer peripherals having an integrated wireless transceiver; and computers and peripherals coupled to a wireless transceiver.

It is noted that in addition to the wireless receiver 14 and the wireless transmitter 16, the interface device can include a smart card receiving slot and a smart card interface as described in U.S. Pat. No. 5,584,043 to Burkart.

FIG. 2 is an external view of a preferred embodiment of the interface device. In this embodiment, the diskette-like housing 10 has a similar shape and a similar size as a 3.5 inch floppy disk. The diskette-like housing 10 may or may not have an equivalent shape and size as a 3.5 inch floppy disk; however, the shape and size facilitates insertion into and retention by a 3.5 inch floppy disk drive.

The transducer 30 is accessible at a first half 40 of the diskette-like housing 10. The transducer 30 is located at a portion of the diskette-like housing 10 corresponding to a location at which a magnetic disk is exposed with a standard 3.5 inch floppy disk.

An infrared transceiver 42 is accessible at an end of a second half 44 of the diskette-like housing 10. The infrared transceiver 42 provides the wireless receiver 14 and the wireless transmitter 16. Preferably, the infrared transceiver 42 is IrDA-compliant to facilitate communication with a variety of existing IrDA-compliant electronic devices.

Figure 3:
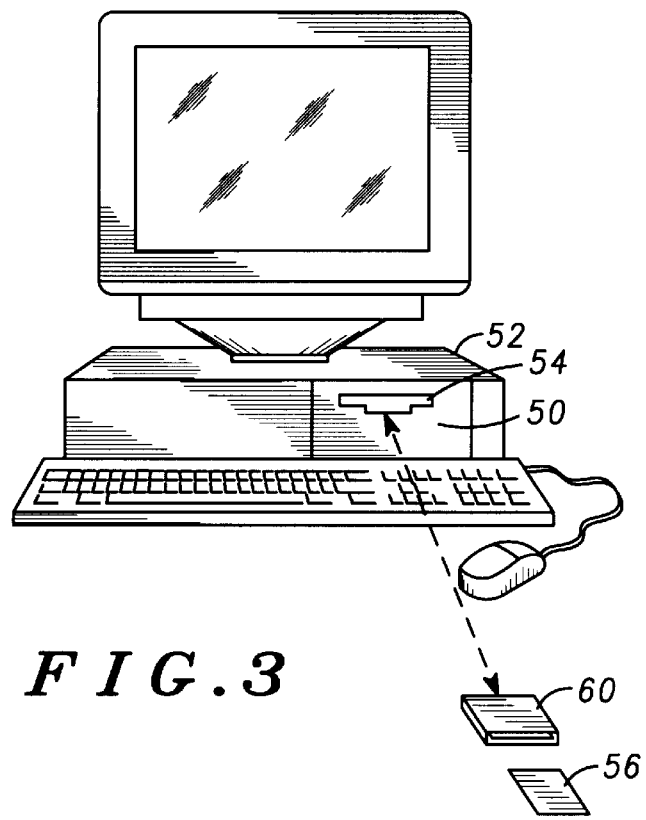
FIG. 3 is a view of the interface device of FIG. 2 inserted into a floppy disk drive of a computer.

FIG. 3 is a view of the interface device of FIG. 2 inserted into a floppy disk drive 50 of a computer 52. When inserted into the floppy disk drive 50, the infrared transceiver 42 is exposed through an opening 54 of the floppy disk drive 50. Using the interface device and the floppy disk drive 50, the computer 52 can read and write data to electronic devices having either an integrated infrared interface or an external infrared interface.

Examples of electronic devices having an integrated infrared interface include, but are not limited to, personal digital assistants, notebook computers, palmtop computers, infrared remote controllers, and wireless input devices such as wireless keyboards and wireless mice. Examples of electronic devices having an external infrared interface include, but are not limited to, a computer having an infrared interface coupled to its serial port or its parallel port, and a printer having an infrared interface coupled to its serial port or its parallel port.

In addition to facilitating wireless communication with the aforementioned computers and peripherals, the interface device 10 can be used to read data from and/or write data to a smart card 56. In this case, the smart card 56 can be interfaced to a smart card reader 60 which wirelessly communicates with the interface device 10. Dependent upon its external interface, the smart card 56 is interfaced to the smart card reader 60 in either a contacting manner or a contactless manner.

The smart card reader 60 includes a wireless transceiver such as an IrDA-compliant infrared transceiver. The transceiver includes a transmitter to generate a wireless signal which encodes data read from the smart card 56. The wireless signal is receivable by the interface device 10. Additionally, the transceiver includes a receiver to receive a wireless signal from the interface device 10, extract data encoded in the wireless signal, and communicate the data to the smart card 56.

Figure 4:
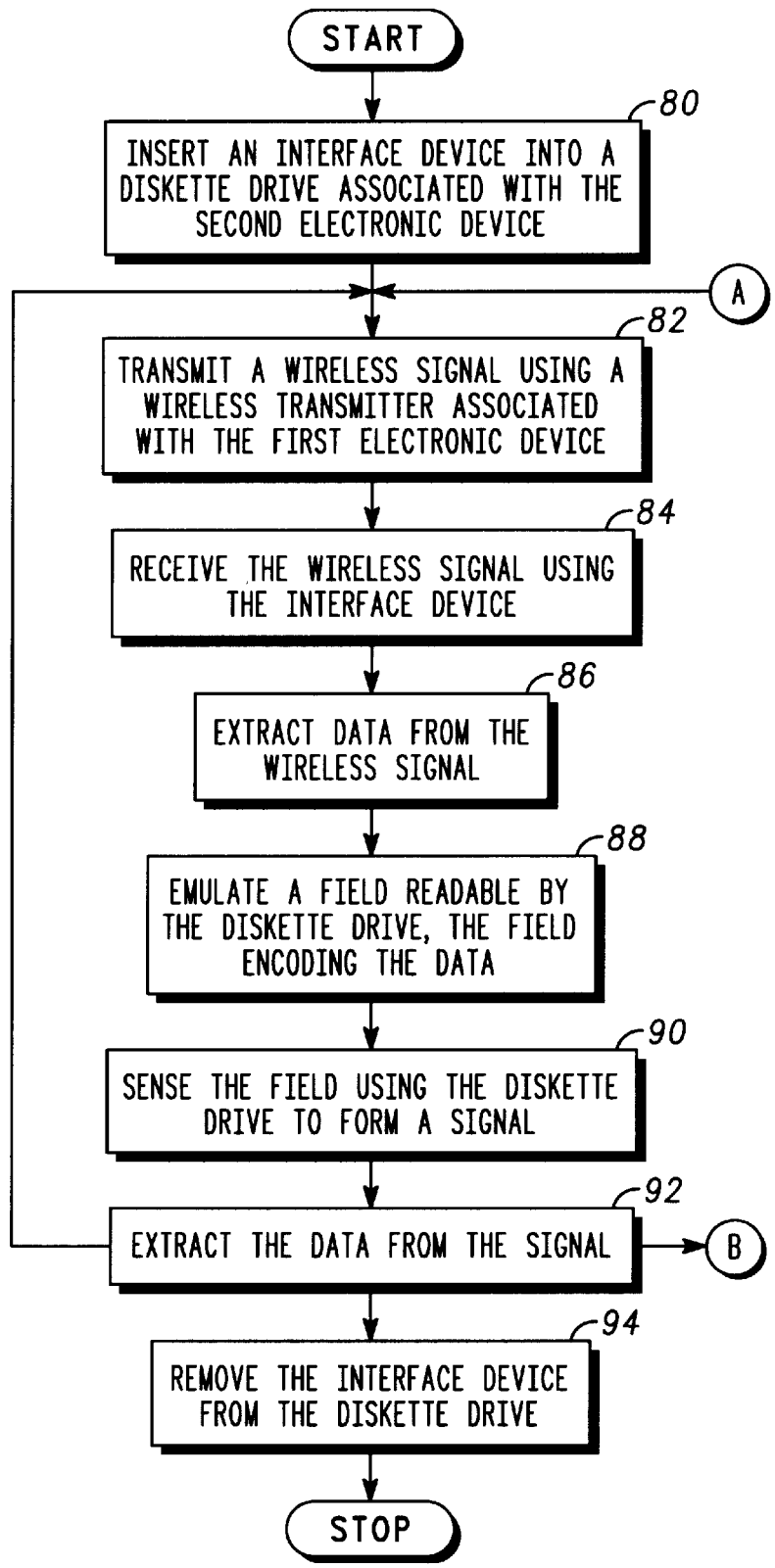
FIG. 4 is a flow chart of an embodiment of a method of communicating data from a first electronic device to a second electronic device.
Figure 5:
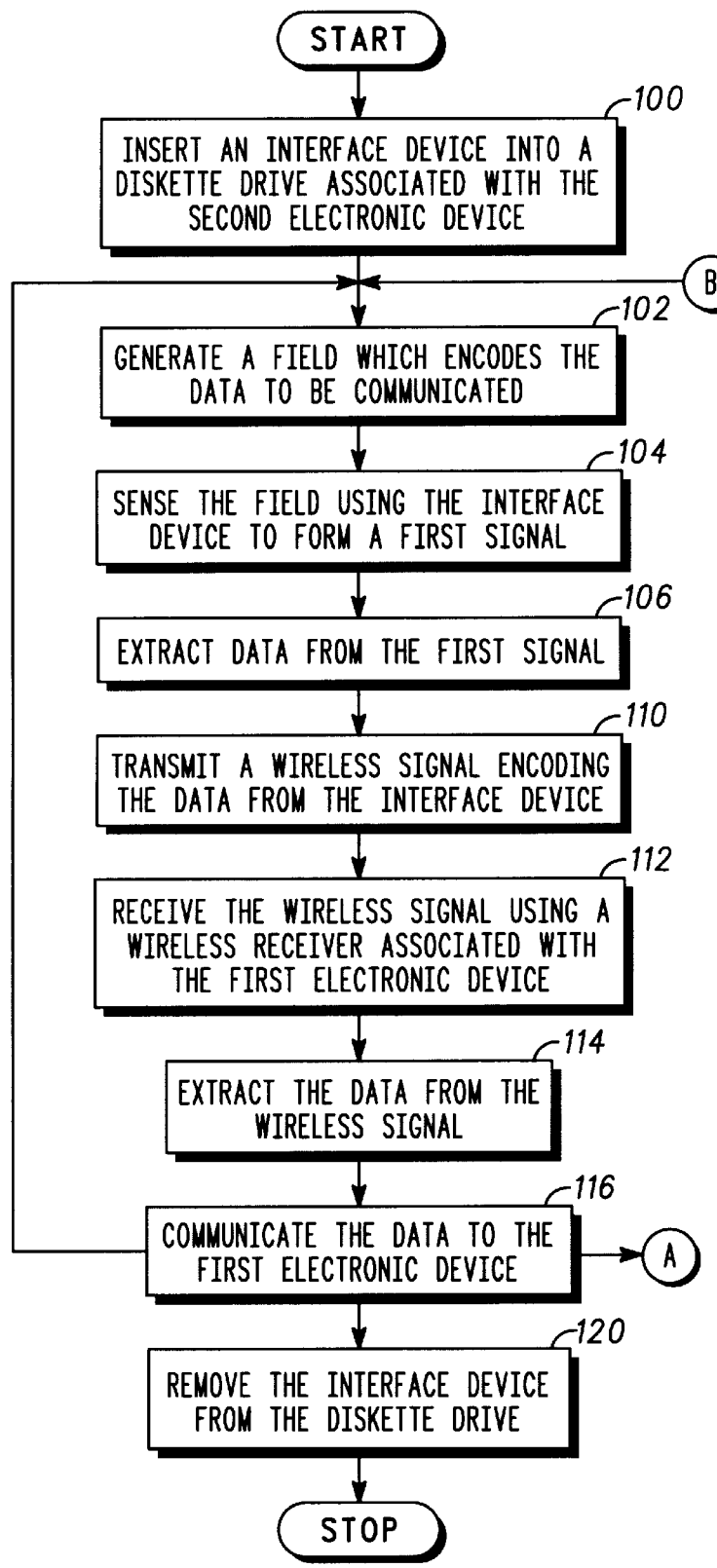
FIG. 5 is a flow chart of an embodiment of a method of communicating data from the second electronic device to the first electronic device.

FIGS. 4 and 5 describe methods of communicating data between electronic devices using interface devices in accordance with the present invention. The electronic devices can include, but are not limited to, any of the aforementioned examples of electronic devices. Examples of data to be communicated include, but are not limited to, smart card data, printer data, input data, remote controller data, and data files.

FIG. 4 is a flow chart of an embodiment of a method of communicating data from a first electronic device to a second electronic device. As indicated by block 80, the method includes a step of inserting an interface device into a diskette drive associated with the second electronic device. Once inserted, at least a portion of the interface device is contained within the diskette drive after insertion. Optionally, an entire portion of the interface device is contained within the diskette. Preferably, the interface device includes an embodiment described with reference to FIG. 1 or FIG. 2.

As indicated by block 82, the method includes a step of transmitting a wireless signal using a wireless transmitter associated with the first electronic device. The wireless signal encodes the data to be communicated from the first electronic device. Preferably, the wireless signal includes an infrared signal such as an IrDA-compliant infrared signal. In a smart card reading application, the step of transmitting the wireless signal includes reading data from the smart card and generating the wireless signal that encodes the data.

As indicated by block 84, the method includes a step of receiving the wireless signal using the interface device. The wireless signal is received while at least a portion of the interface device is within the diskette drive. The wireless receiver of the interface device can be fully contained within the diskette drive when the wireless signal is received, or can be fully or partially exterior to the diskette drive when the wireless signal is received.

As indicated by block 86, the method includes a step of extracting the data from the wireless signal. The step of extracting the data from the wireless signal is performed by the interface device, and is performed while the interface device is within the diskette drive. Preferably, the data is extracted in accordance with an IrDA communication protocol.

As indicated by block 88, the method includes a step of emulating a field readable by the diskette drive. The field encodes the data extracted from the wireless signal. The step of emulating the field is performed by the interface device while the interface device is within the diskette drive. Preferably, the field includes a magnetic field emulating data from a rotating floppy disk.

As indicated by block 90, the method includes a step of sensing the field using the diskette drive. The step of sensing is performed using the read head of the diskette drive. The step of sensing results in a signal, such as an electrical signal, associated with the field.

As indicated by block 92, the method includes a step of extracting the data from the signal. The data is extracted by the diskette drive and/or the second electronic device. Thereafter, flow of the method can either: (i) return to block 82 wherein a subsequent wireless signal encoding subsequent data is transmitted; (ii) go to block 102 described with reference to FIG. 5; or (iii) go to block 94 wherein a step of removing the interface device from the diskette drive is performed.

FIG. 5 is a flow chart of an embodiment of a method of communicating data from the second electronic device to the first electronic device. If the interface device is not within the diskette drive associated with the second electronic device, a step of inserting the interface device into the diskette drive is performed as indicated by block 100.

As indicated by block 102, the method includes a step of generating a field which encodes the data to be communicated. The field is generated using the write head of the diskette drive.

As indicated by block 104, the method includes a step of sensing the field to form a first signal. The field is sensed by the interface device while the interface device is within the diskette drive. The transducer of the interface device forms the first signal from the field.

As indicated by block 106, the method includes a step of extracting the data from the first signal. The step of extracting the data from the first signal is performed by the circuit while the interface device is within the diskette drive.

As indicated by block 110, the method includes a step of transmitting a wireless signal from the interface device. The wireless signal encodes the data extracted from the signal in the step of block 106. The step of transmitting the wireless signal is performed by the wireless transmitter while the interface device is within the diskette drive.

As indicated by block 112, the method includes a step of receiving the wireless signal using a wireless receiver associated with the first electronic device. As indicated by block 114, the method includes a step of extracting the data from the wireless signal.

As indicated by block 116, the method includes a step of communicating the data to the first electronic device. In a smart card application, this step includes communicating the data to a smart card.

Flow of the method can either: (i) return to block 102 wherein a subsequent field encoding subsequent data is generated; (ii) go to block 82 described with reference to FIG. 4; or (iii) go to block 120 wherein a step of removing the interface device from the diskette drive is performed.

Thus, there has been described herein several embodiments including preferred embodiments of a device having a diskette-like housing and a wireless transceiver and methods therefor.

Because the various embodiments of the present invention provide an interface device having an infrared transceiver supported by a diskette-like housing, they provide a significant improvement in that the interface device is not dedicated to a single application. The interface device can be used to read smart cards, and to communicate with other devices having an infrared interface.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An apparatus comprising:

a diskette-like housing which defines a spindle-receiving portion; and an infrared receiver externally-accessible at a central portion of an end of the diskette-like housing, wherein the infrared receiver overlaps at least a portion of the spindle-receiving portion along a length of the diskette-like housing.

2. The apparatus of claim 1 wherein the infrared receiver is externally-accessible when the diskette-like housing is inserted into a diskette drive.

3. The apparatus of claim 1 further comprising a transducer responsive to the infrared receiver, the transducer accessible at a first portion of the diskette-like housing, the infrared receiver accessible at a second portion of the diskette-like housing.

4. The apparatus of claim 1 wherein the diskette-like housing is receivable by a 3.5" diskette drive.

5. An apparatus comprising:

a diskette-like housing which defines a spindle-receiving portion; and an infrared transmitter externally-accessible at a central portion of an end of the diskette-like housing, wherein the infrared transmitter overlaps at least a portion of the spindle-receiving portion along a length of the diskette-like housing.

6. The apparatus of claim 5 wherein the infrared transmitter is externally-accessible when the diskette-like housing is inserted into a diskette drive.

7. The apparatus of claim 5 further comprising a transducer accessible at a first half of the diskette-like housing, wherein the infrared transmitter is accessible at a second half of the diskette-like housing and is responsive to the transducer.

8. The apparatus of claim 5 wherein the diskette-like housing is receivable by a 3.5" diskette drive.

9. An apparatus comprising:

a diskette-like housing;

an infrared receiver externally-accessible at a central portion of an end of the diskette-like housing; and a transducer responsive to the infrared receiver to generate a magnetic field associated with data received by the infrared receiver, wherein the magnetic field is directly readable by a read head of a diskette drive;

wherein the infrared receiver overlaps at least a portion of the transducer along a length of the diskette-like housing.

10. An apparatus comprising:

a diskette-like housing;

a transducer directly sensitive to a magnetic field produced by a write head of a diskette drive to receive data; and an infrared transmitter externally-accessible at a central portion of an end of the diskette-like housing, the infrared transmitter responsive to the transducer to generate an infrared signal associated with the data received by the transducer;

wherein the infrared transmitter overlaps at least a portion of the transducer along a length of the diskette-like housing.

\* \* \* \* \*